United States Patent
Langley, Sr. et al.

(10) Patent No.: US 6,751,699 B1
(45) Date of Patent: Jun. 15, 2004

(54) FIBRE CHANNEL MINI-HUB POWERED BY AND SUPPORTED WITHIN A HOST COMPUTER AND DIRECTLY CONTROLLED OVER A BUS OF THE HOST COMPUTER

(75) Inventors: Richard Wade Langley, Sr., Beavercreek, OH (US); Paul Martin Davis, Kettering, OH (US)

(73) Assignee: Systran Corporation, Dayton, OH (US)

( * ) Notice: Subject to any disclaimer, the term of this patent is extended or adjusted under 35 U.S.C. 154(b) by 551 days.

(21) Appl. No.: 09/776,802

(22) Filed: Feb. 5, 2001

Related U.S. Application Data

(60) Provisional application No. 60/216,830, filed on Jul. 7, 2000.

(51) Int. Cl.[7] .......................... G06F 13/00; H04L 12/40
(52) U.S. Cl. .................. 710/317; 710/300; 370/360
(58) Field of Search ............................. 710/316, 317, 710/300, 38, 36; 714/4; 713/300; 370/360, 400, 351, 401, 422; 340/825

(56) References Cited

U.S. PATENT DOCUMENTS

| | | | |
|---|---|---|---|
| 4,872,157 A | * | 10/1989 | Hemmady et al. |
| 5,883,792 A | * | 3/1999 | Summers et al. |
| 5,901,151 A | * | 5/1999 | Bleiweiss et al. |
| 6,185,203 B1 | * | 2/2001 | Berman |
| 6,550,029 B1 | * | 4/2003 | Bailey et al. |

OTHER PUBLICATIONS

"Flow Control in a high–speed bus–based ATM switching hub" by Song Chong , Ramesh Nagarajan, Yung–Teng Wang (abstract only).*

* cited by examiner

*Primary Examiner*—Gopal C. Ray
(74) *Attorney, Agent, or Firm*—Stevens & Showalter LLP

(57) ABSTRACT

FC and FX mini-hubs with a limited number of ports, e.a., 4–8 ports, provide a wide variety of configurations for small form factors. The mini-hubs provide compact, low cost hubs for form factors that can include PMC, CompactPCI, and VME. The mini-hubs are installed into an unused system slot of a host computer or as a mezzanine card for use in the host computer. Thus, the mini-hubs use power received directly from the backplane of the host computer so that no external power connections are required and mechanical support is provided by the system chassis or carrier card into which a mini-hub is installed. The mini-hubs eliminate external communication/control cabling since managed mini-hubs are controlled directly via the system bus of the host computer. This direct communication also reduces system latency.

18 Claims, 9 Drawing Sheets

Broadcast Topology

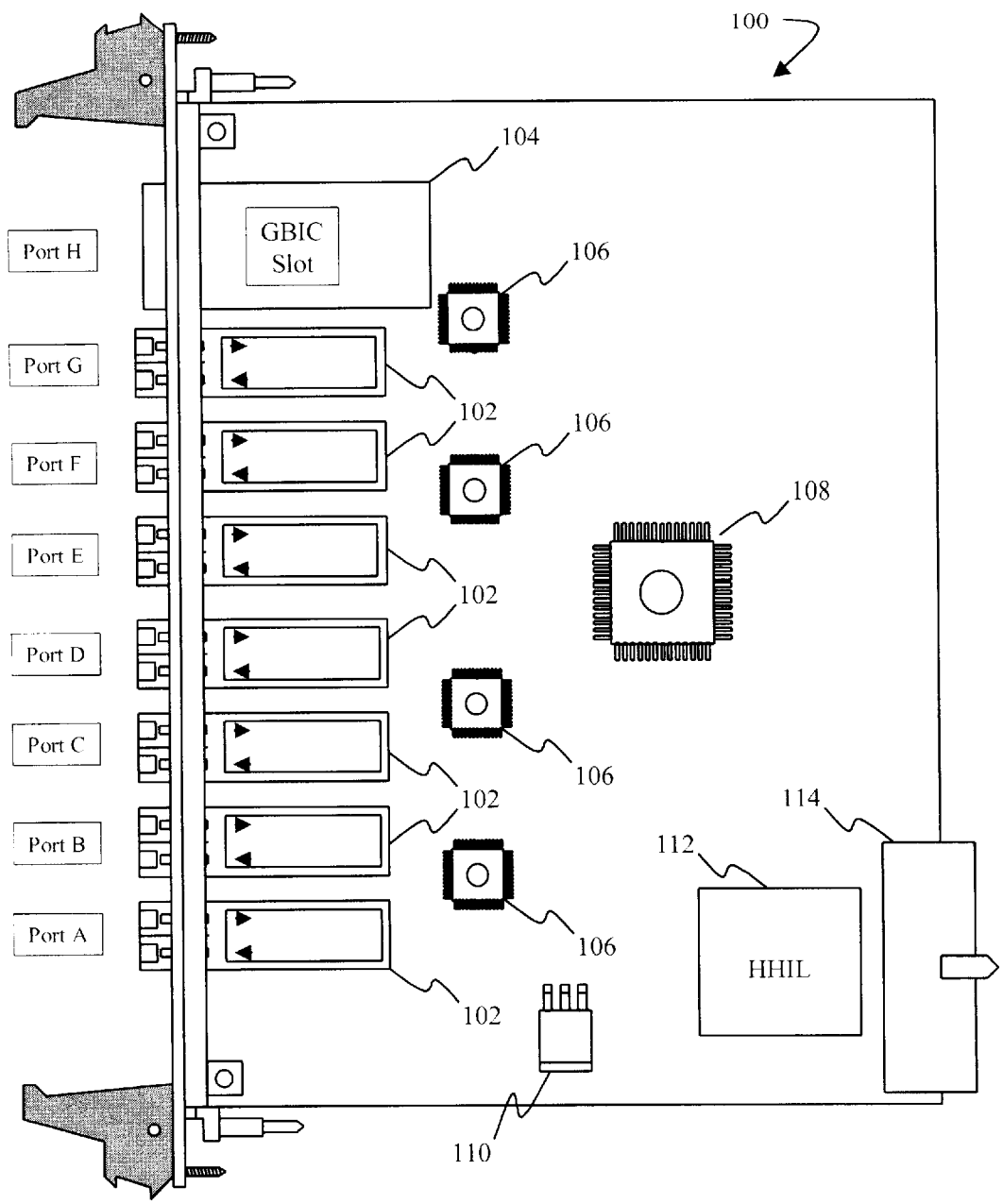
Figure 1 - 6U CompactPCI 8-Port Mini Hub

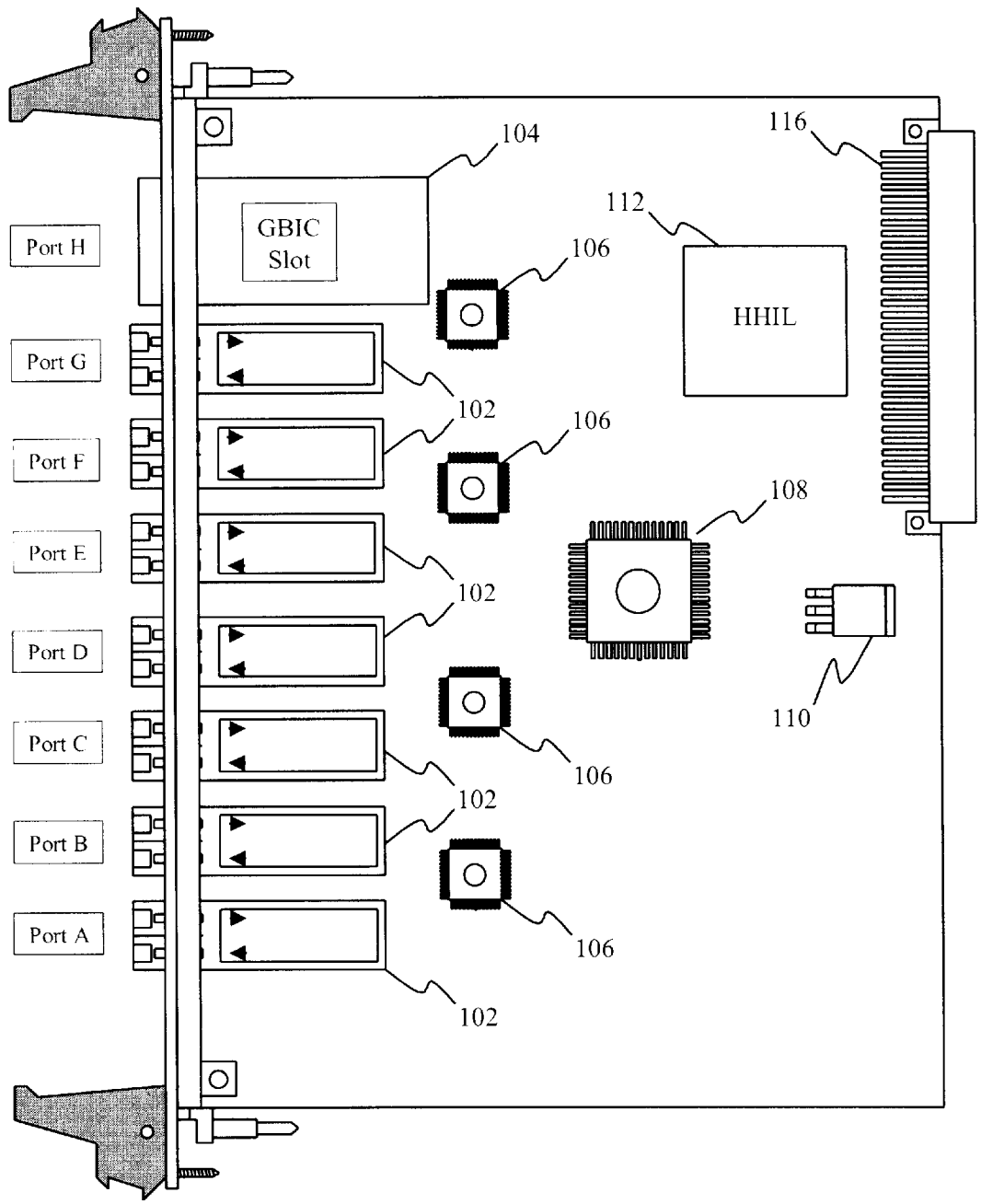
Figure 2 - 6U VME 8-Port Mini Hub

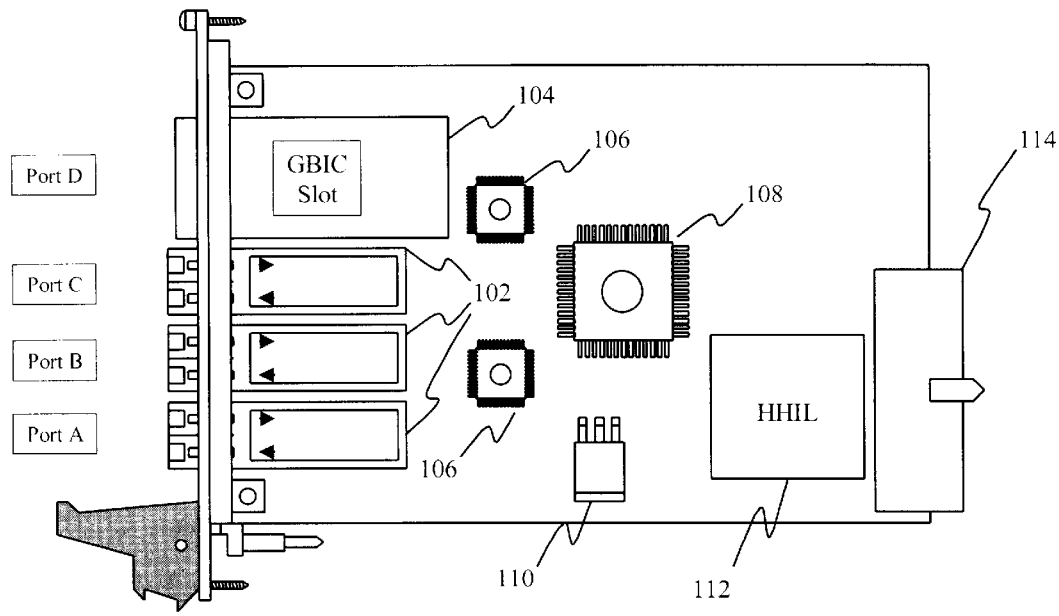
Figure 3 – 3U CompactPCI 4-Port Mini Hub
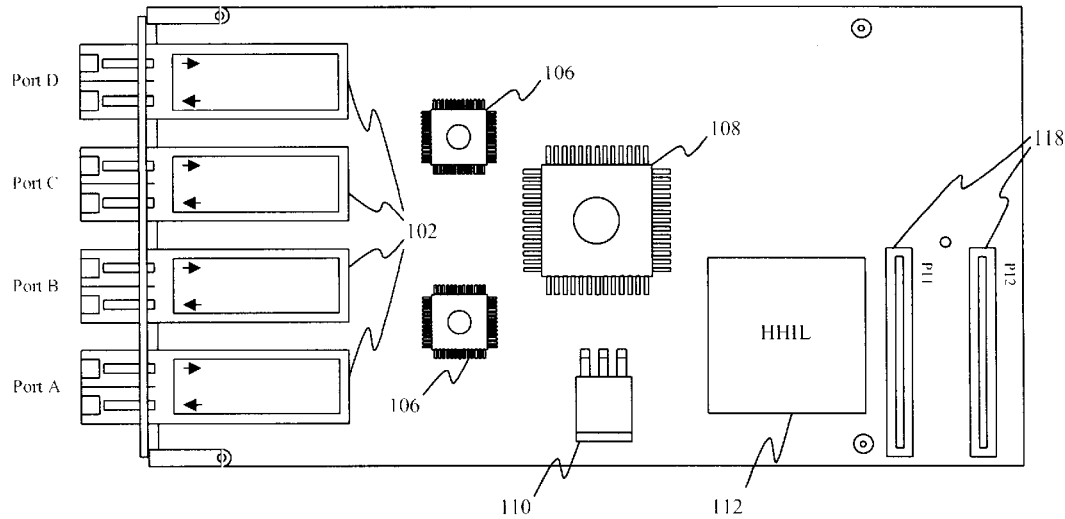
Figure 4 - PMC 4-Port Mini Hub

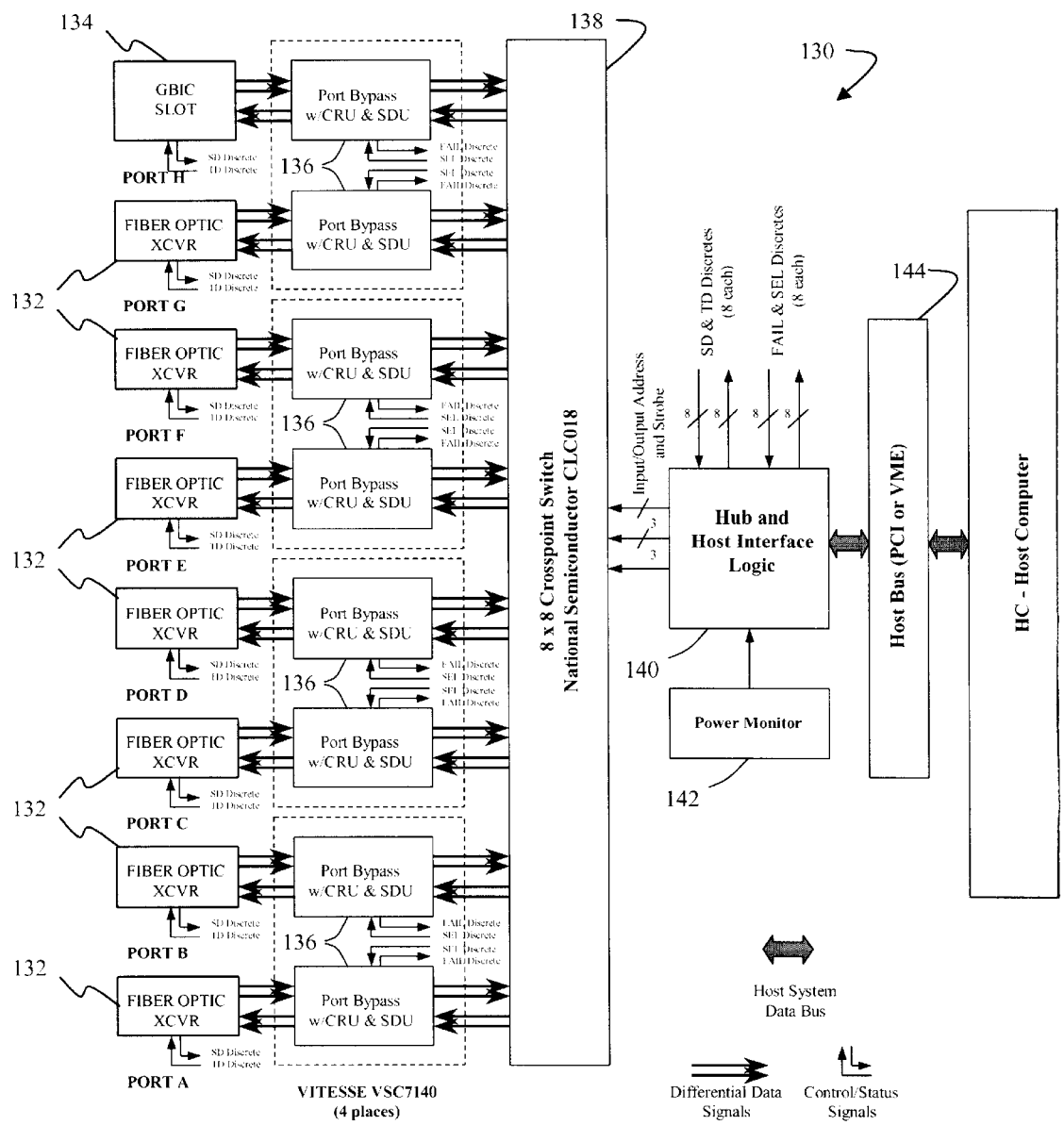
Figure 5 – 8-Port Mini Hub

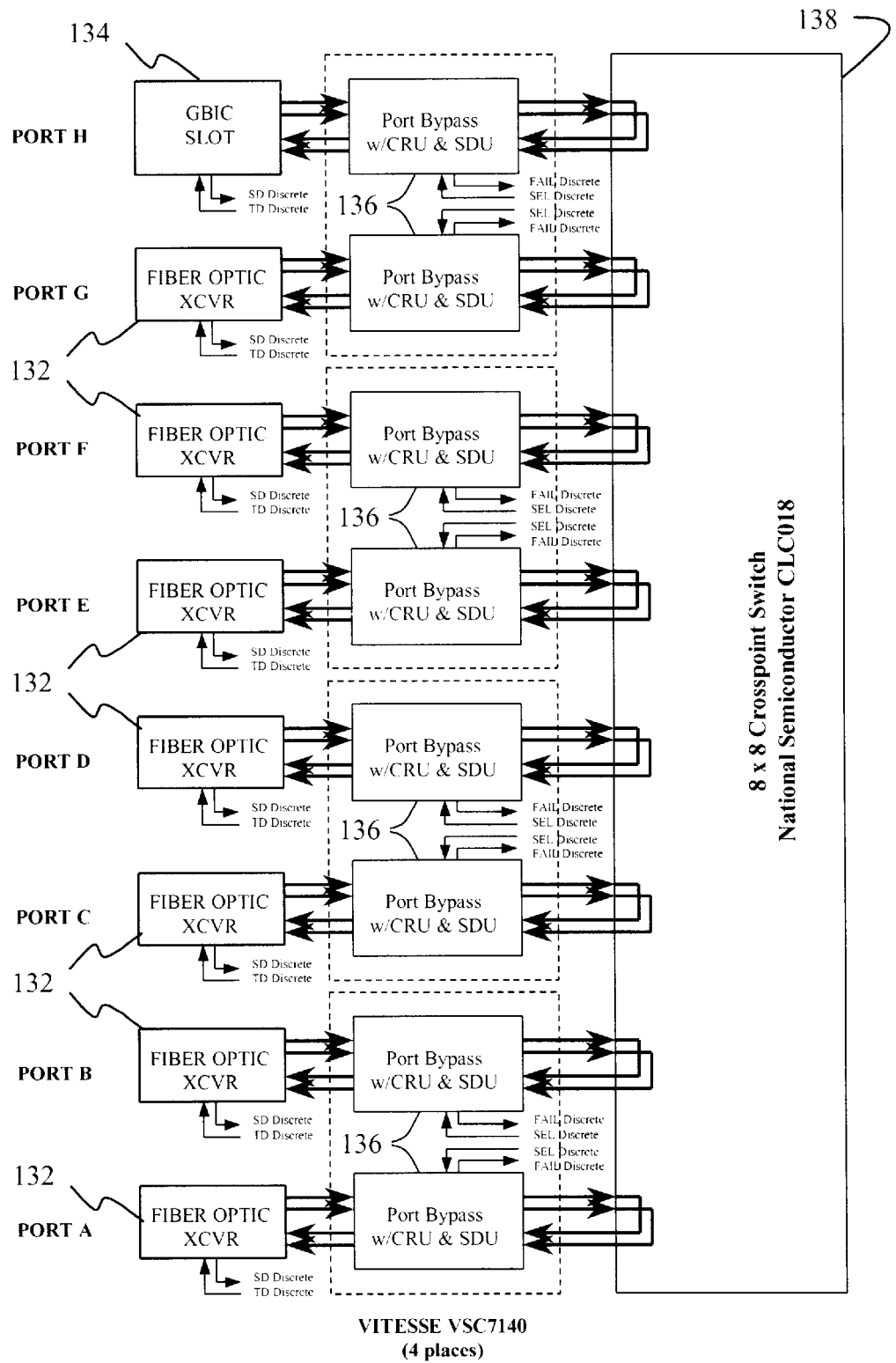
Figure 6 – Default Crosspoint Switch Configuration

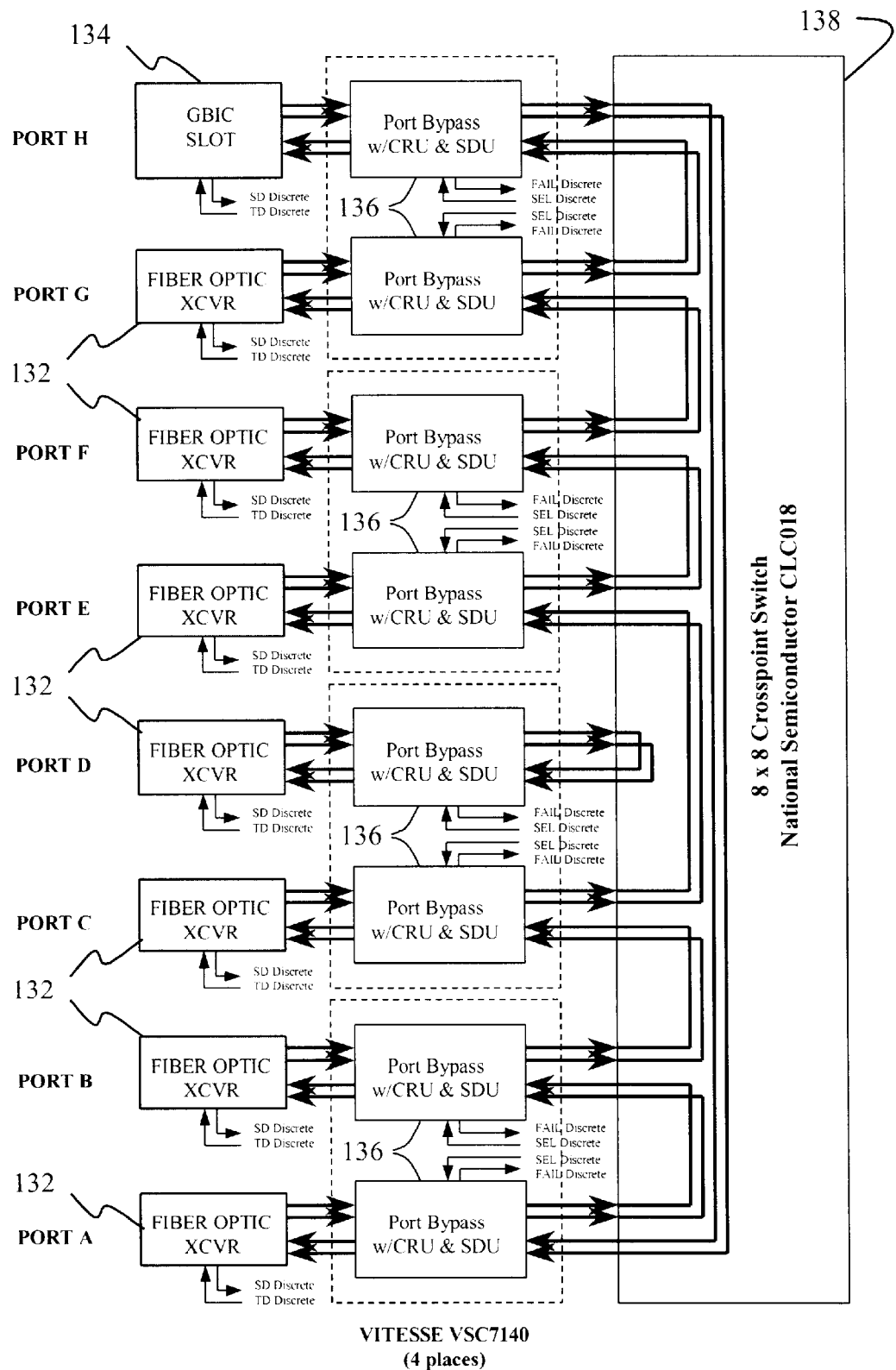
Figure 7 – Fibre Channel Arbitrated Loop Topology

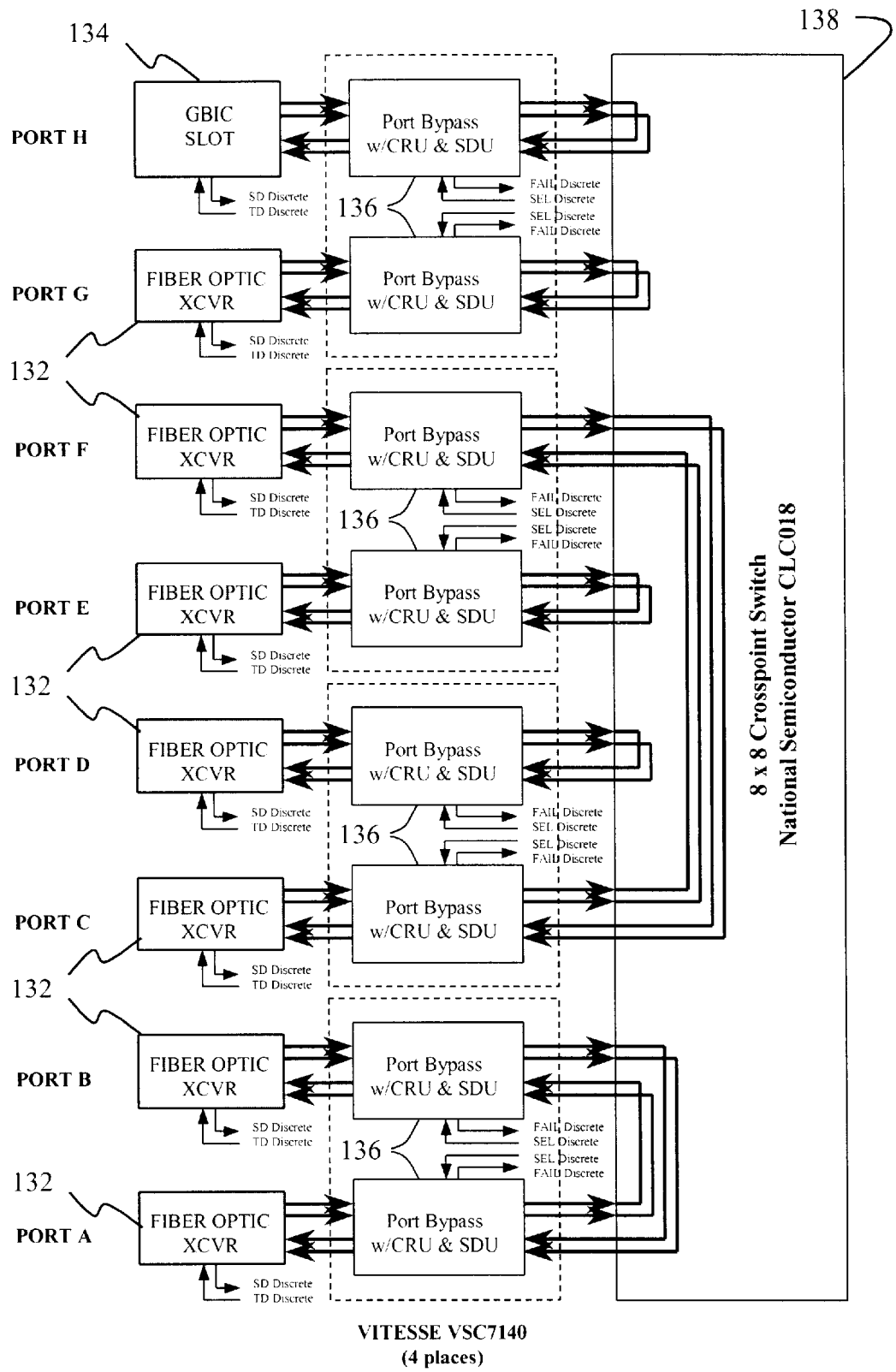
Figure 8 – Point-to-Point Topology

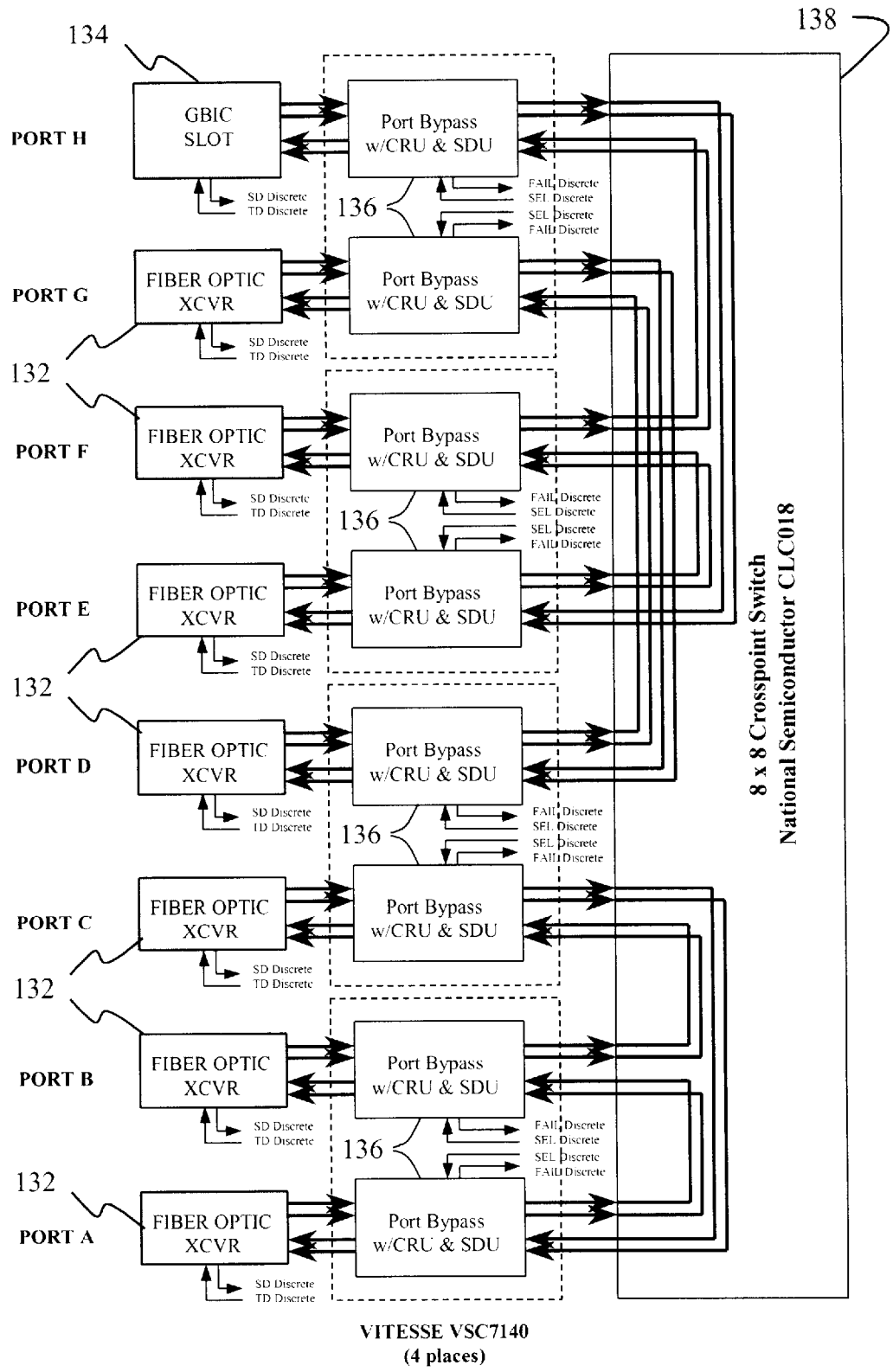
Figure 9 – Mixed Topology

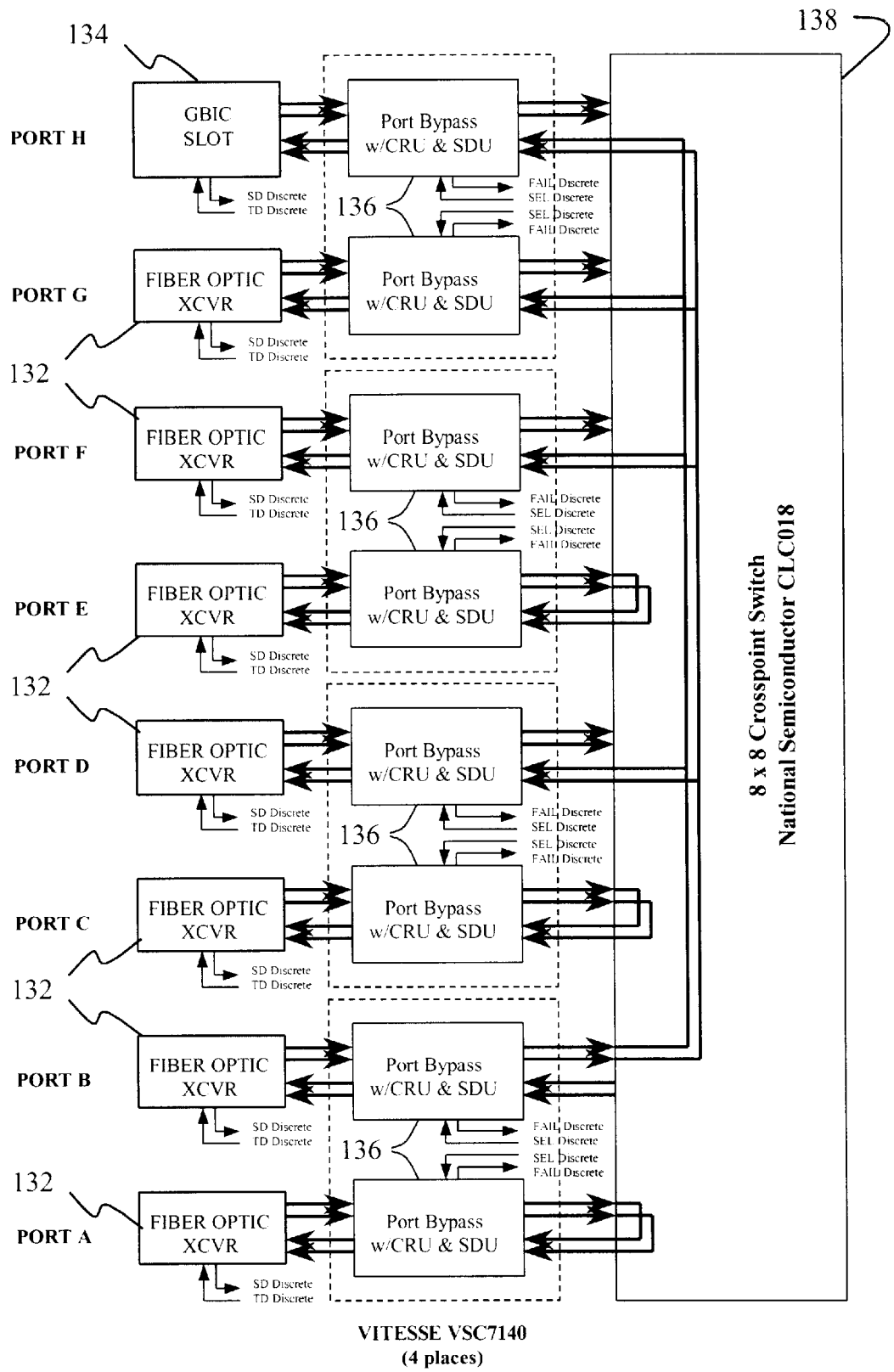
Figure 10 – Broadcast Topology

FIBRE CHANNEL MINI-HUB POWERED BY AND SUPPORTED WITHIN A HOST COMPUTER AND DIRECTLY CONTROLLED OVER A BUS OF THE HOST COMPUTER

CROSS REFERENCE TO RELATED APPLICATIONS

This application claims the benefit of U.S. Provisional Patent Application No. 60/216,830 filed Jul. 7, 2000, now abandoned and entitled FIBRE CHANNEL MINI-HUB, which is incorporated herein by reference.

BACKGROUND OF THE INVENTION

The present invention relates in general to high speed communications equipment and, more particularly, to small hubs or mini-hubs which do not require external power cabling, take up less space than existing hubs and, in the case of managed mini-hubs, can be controlled directly via a computer's system bus without requiring a separate RS-232, Ethernet or other communication/control connection. While the present invention is generally applicable to high speed communications equipment, it will be described herein with reference to Fibre Channel (FC) and FibreXtreme (FX) (a trademark of Systran Corporation, assignee of the present application) data link equipment for which it is particularly applicable and initially being used. The description will refer to either of these systems by the term Fibre Channel even though FX uses a protocol that is a modification of the standard FC protocol.

Commercially available FC hubs are implemented in rack mounted boxes that require external power cabling and communication/control connections in the case of managed hubs. These hubs are not well suited for use in embedded, real-time, military/defense and industrial applications where equipment must be small, requires minimum cabling and low power levels, can be easily "ruggedized" and provides low latency. Computer systems used in these applications are typically implemented in VERSAmodule Eurocard (VME) and Compact Peripheral Computer Interconnect (CompactPCI) formats.

Currently available managed hubs require some type of connection to a computer that monitors status and controls the configuration of the hub. Today's hubs typically use an RS-232 or Ethernet connection to achieve the monitoring/control connections.

Monitoring and control of a hub over a serial connection, such as RS-232 or Ethernet, requires software overhead to assemble communication packets and additional hardware to serialize/deserialize the packets. Additionally, such hubs are only able to support Arbitrated Loop topologies.

There is, thus, a need for improved Fibre Channel hubs for use in embedded, real-time, military/defense and industrial applications that do not require a separate source of power or a separate control connection. Preferably, such hubs would be able to support topologies in addition to Arbitrated Loop including, for example, topologies such as Point-to-Point, One to Many (broadcast) or loop segmenting (where ports can be grouped into separate independent loops).

SUMMARY OF THE INVENTION

This need is met by the invention of the present application wherein mini-hubs comprising a wide variety of configurations can be produced in small form factors to provide FC and FX type hubs with a limited number of ports, for example four (4) to eight (8) ports. The mini-hubs of the present invention provide compact, low cost hubs for form factors that can include, without limitation, PCI Mezzanine Card (PMC), CompactPCI, and VME. The mini-hubs of the present invention are easily installed into an unused system slot of a host computer or as a mezzanine card for use in the host computer. Thus, mini-hubs of the present invention use system power received directly from the backplane of the host computer so that no external power cabling connections are required and mechanical support is provided by the system chassis or carrier card into which a mini-hub is installed. With the mini-hubs of the present invention, external RS-232 or Ethernet communication/control cabling is eliminated altogether since for managed mini-hubs the system bus of the host computer, for example a VME, CompactPCI or PCM bus, is used to communicate with the managed mini-hub. This direct communication also reduces system latency. In this way, the mini-hubs meet the cabling, power, ruggedization, and low latency requirements required in embedded, real-time, military/defense and industrial applications.

BRIEF DESCRIPTION OF THE DRAWINGS

FIG. 1 is a physical layout of components of an 8-port mini-hub in accordance with the present invention on a 6U CompactPCI circuit card;

FIG. 2 is a physical layout of components of an 8-port mini-hub in accordance with the present invention on a 6U VME circuit card;

FIG. 3 is a physical layout of components of a 4-port mini-hub in accordance with the present invention on a 3U CompactPCI circuit card;

FIG. 4 is a physical layout of components of a 4-port mini-hub in accordance with the present invention on a PMC circuit card;

FIG. 5 is a schematic block diagram of an 8-port mini-hub circuit in accordance with the present invention; and FIGS. 6–10 illustrate exemplary switch configurations that can be achieved in accordance with the present invention.

DETAILED DESCRIPTION OF THE INVENTION

The mini-hub invention of the present application can be configured in a variety of embodiments that provide FC and FX type hubs with a limited number of ports, for example four (4) to eight (8) ports, in small form factors (i.e., known to those skilled in the art as specifying the mechanical and electrical interfaces for a circuit card or board design) to provide compact, low cost mini-hubs. Possible form factors that can be used include, without limitation, PMC, CompactPCI, and VME. The mini-hubs of the present application are easily installed by means of an unused system slot of a host computer and they use system power received directly from the backplane of the host computer. In this way, no external power connections are required and mechanical support is provided by the system chassis or carrier card into which a mini-hub is installed.

A first mini-hub embodiment of the mini-hub 100 of the present application provides eight (8) ports in a 6U CompactPCI form factor. See FIG. 1 which shows a physical layout of the mini-hub components for the first embodiment including: eight ports, A-H, including seven (7) small form factor (SFF) fiber optic transceivers (XCVRs) 102 and one (1) gigabit interface converter (GBIC) 104; four (4) port bypass circuits 106; an 8×8 crosspoint switch 108; a +5 volt to +3.3 voltage converter/regulator 110; a Hub and Host Interface Logic (HHIL) circuit 112; and, a CompactPCI backplane connector 114, A second embodiment is shown in FIG. 2 which provides eight (8) ports in a 6U VME form factor with like elements labeled with like reference numerals so that the primary difference, other than component orientation, is the provision of a VME backplane connector 116, FIGS. 3 and 4 show two additional embodiments that provide four (4) ports with FIG. 3 showing an embodiment in a 3U CompactPCI form factor and FIG. 4 showing an embodiment in a PCI Mezzanine Card (PMC) form factor. Here again, like elements are labeled with the same reference numerals used in FIGS. 1 and 2 so that the only primary difference is the provision of PMC connectors 118 in the embodiment of FIG. 4.

The mini-hub 100 supports hub management and can be configured for an automatic or "auto mode" of operation as will be described hereinafter. Presently, the mini-hubs support 1.0625 Gbps FC and FX bit rates with expansion to a 2.125 Gbps Fibre Channel bit rate support contemplated in accordance with the present invention as soon as 2.125 Gbps Fibre Channel port bypass circuit chips with Clock Recovery/Signal Detection capability are available. For hub management, a host computer (not shown) monitors the status of each of the ports and selectively enables or disables each port. Hub management is provided via an interface logic circuit, the HHIL, provided between the mini-hub and the system/host bus (PCI or VME). As the name implies, for auto mode operation each port is automatically monitored and controlled through the mini-hub circuitry as will be described hereinafter.

The following terms and signal definitions will be used in the remainder of the detailed description:

CRU—Clock Recovery Unit, internal to the port bypass circuits, provides retiming;

SDU—Signal Detect Unit, internal to port bypass circuits, provides detection of valid Fibre Channel type signals;

FAIL—Signal generated by a port bypass circuit to indicate loss of input signal;

SD—Signal Detect signal generated by a fiber optic transceiver (XCVR) to indicate signal present on the XCVR input;

TD—Transmitter Disable, generated by a Hub and Host Interface Logic circuit (HHIL) and sent to an associated fiber optic XCVR to turn off the laser transmitter of the XCVR;

OAx—Output Address 0-2 transmitted from the HHIL to a crosspoint switch to select the PORT output addressed by "x" for configuration of a mini-hub switch circuit and hence the mini-hub;

IAx—Input Address 0-2 transmitted from the HHIL to the crosspoint switch to select the input PORT addressed by "x" for configuration of the mini-hub switch circuit and hence the mini-hub;

TS—Tri-State, control signal to the crosspoint switch to disable the addressed output; and, GBIC—GigaBit Interface Converter, an industry standard swappable fiber optic or copper media module.

An 8-port mini-hub circuit 130 is shown in schematic block diagram form in FIG. 5. The 8-port circuit was chosen for this description since the 4-port design is similar but has a reduced number of ports so that its structure is apparent from the 8-port design. The mini-hub circuit 130 comprises the following components. Seven (7) Small Form Factor (SFF) fiber optic transceivers (XCVRs) 132 which include LC type connectors. One (1) GBIC module 134 for user selected media types is provided. Four (4) port bypass circuits (PBCs) 136 are provided with four (4) Vitesse VSC7140 Fibre Channel Port Bypass Circuit chips being illustrated for possible use in the present invention. One (1) switch 138 interconnecting the port bypass circuits 136 with a National Semiconductor 8×8 Crosspoint Switch being illustrated for possible use in the present invention. A Hub and Host Interface Logic circuit (HHIL) 140 which currently is constructed using a programmable logic device, such as a XC30SXL-4PQ208 which is commercially available from XILINX. A power monitor circuit 142 which can comprise a voltage comparator. A +5 volt to +3.3 volt regulator and filtering circuit 110 (see FIGS. 1–4) and a host bus connector 144, Each of the SFF fiber optic XCVRs 132 and the GBIC module 134 provide the SD signal to the HHIL 140, The HHIL 140 and the host computer (HC—for managed operation) use the SD signal in conjunction with the FAIL signal to determine how to configure the corresponding port. The TD signal is sent to each of the SFF XCVRs 132 and the GBIC module 134 to turn off the laser transmitter of the XCVR when the corresponding port is disabled. The TD signal is controlled by the HHIL alone in auto mode or by the host computer (via the HHIL) in managed mode.

The port bypass circuits 136 provide clock recovery units (CRUs) and signal detect units (SDUs). The CRUs provide synchronization and retiming to the onboard reference clock to minimize or reduce system jitter. The SDUs monitor the incoming signals on their corresponding ports and check that the signals are valid Fibre Channel bit streams. Specifically, the signals are checked for run length errors (more than 5 consecutive logic 1's or 0's) or the absence of the K28.5 character (Fibre Channel command prefix) that should be present in the bit stream at least 2 times between each frame: If an SDU detects either of the described errors within a preset time period, the respective FAIL signal will be true. The timeout period is based on the detection of an error in 4 consecutive 1.5 Fibre Channel frames which is equivalent to 120 microseconds maximum and is dependent on the frame length. The HHIL 140 monitors the state of the FAIL signal and acts on it according to whether the HHIL 140 is operating in the auto mode or the managed mode. In the auto mode, the FAIL signal is used by the HHIL 140 to determine whether the corresponding port's input signal should be switched into the loop or not. In managed mode, the FAIL signal is available to the host computer via a status register in the HHIL 140, An interrupt is also provided to the host computer to indicate a change in the state of the FAIL signal indicating either a transition from a "good' input signal to a "bad" input signal or vice versa. The host computer can decide based on the FAIL signal how to configure the corresponding port.

The switch 138 provides all of the port configuration switching and can switch any port input to any port output under control of the HHIL 140 and/or the host computer. The switch 138 works by addressing the desired output (OAx) and providing the input address (IAx) to which it is connected. The OAx and IAx addresses are provided by the HHIL 140, The HHIL 140 provides the logic necessary to receive and decode requests from the host computer to change the mini-hub configuration or to provide status. The HHIL 140 also contains the logic necessary to generate the appropriate control signals to the SFF fiber optic XCVRs 132, the GBIC module 134, the port bypass circuits (PBCs) 136, and the switch 138, The control signals are either generated automatically, in auto mode, or are based on requests received from the host computer. In auto mode, the HHIL 140 generates the OAx and IAx addresses to the switch 138 based on detection of valid and invalid port input signals, i.e., it checks the FAIL signal. If the FAIL signal is true, the corresponding port is "wrapped", i.e., the input to the port is connected to its output to "wrap" the signal back to its source. If the FAIL signal is false, the input signal is connected into the loop. In managed mode, the host computer sends its requests to configure the switch across the system bus to the HHIL 140, which receives and decodes these requests and either configures the switch 138 and/or the port bypass circuits (PBCs) 136 or provides the requested status back to the host computer. In the managed mode, the HHIL 140 only interprets commands from the host computer and acts accordingly. In managed mode, the HHIL 140 does nothing without being commanded to do so. The HHIL 140 maintains a set of eight (8) control/status registers labeled PORT A through PORT H that are accessible to the host computer in managed mode. The eight (8) control/status registers are defined in Table 1,

TABLE 1

Crosspoint Switch Output Configuration Control/Status Register

| Bit 8 | Bit 7 | Bit 6 | Bit 5 | Bit 4 | Bit 3 | Bit 2 | Bit 1 | Bit 0 |     |
|-------|-------|-------|-------|-------|-------|-------|-------|-------|-----|
| P     |       | FAILA | SDA   | TDA   | TS    | IA2   | IA1   | IA0   | PORTA |
| W     | E     | FAILB | SDB   | TDB   | TS    | IA2   | IA1   | IA0   | PORTB |
| R     | R     | FAILC | SDC   | TDC   | TS    | IA2   | IA1   | IA0   | PORTC |
| —     | R     | FAILD | SDD   | TDD   | TS    | IA2   | IA1   | IA0   | PORTD |
| G     | S     | FAILE | SDE   | TDE   | TS    | IA2   | IA1   | IA0   | PORTE |
| O     | E     | FAILF | SDF   | TDF   | TS    | IA2   | IA1   | IA0   | PORTF |
| O     | L     | FAILG | SDG   | TDG   | TS    | IA2   | IA1   | IA0   | PORTG |
| D     |       | FAILH | SDH   | TDH   | TS    | IA2   | IA1   | IA0   | PORTH |
| R     | R/W   | R     | R     | R/W   | R/W   | R/W   | R/W   | R/W   |     |

R/W indicates that the bit can be read and written by the host computer and R indicates that the bit is read only. Bits 9 through 15 are not shown but are read only and default to '0'.

The eight (8) control/status registers provide a low latency interface between the host computer and the switch 138, Typical VME or PCI system bus access times will be well under one (1) microsecond. This one (1) microsecond access time is contrasted with other types of controlling interfaces, such as RS-232 or Ethernet, which can require well over a millisecond for a command to propagate to the switch 138 due primarily to the S/W overhead involved In building the communication protocol packets that are sent across the media. Mini-hubs in accordance with the present invention provide a direct channel from the host computer to the switch 138 thereby greatly reducing system latency. The mini-hubs also provide for a deterministic command/response time estimate which Is not possible when RS-232 or Ethernet are used.

Each port has its own corresponding register in the HHIL 140 with each register also corresponding to an output of the switch 138, The configuration of a particular switch/port output is controlled by writing the desired input address (IA2–IA0) in the lower 3 bits of the corresponding register. For example, to connect PORT G's input to PORT B's output, the following data word would be written to the PORT B register:
In binary: xxxxxxxyxx00110
In this example the 'x' bits are don't care because they correspond to the read only bits in the register. The 'y' bit (Bit 7) corresponds to an error select signal (ERRSEL) that changes the timeout value in the port bypass circuits (PBCs) 136, The 'y' bit is typically set by the host computer at initialization and never changed. The Tri-state (TS) bit (Bit 3) is used to force the corresponding switch output to Tri-State which is not typically used but is provided in case it is needed.

The power monitor 142 compares the output of the +3.3 volt regulator to a fixed reference voltage. If the output is within set limits, the power good (PWR_GOOD) signal is true; if the output is outside the set limits, then the PWR_GOOD signal is false. The PWR_GOOD signal is available to the host computer in managed mode operation via status register Bit 8 and can generate an interrupt when the PWR_GOOD signal transitions from true to false. The PWR_GOOD signal is also used to light a front panel status indicator.

A number of different mini-hub configurations will now be described with reference to FIGS. 6–10 to show the various switch configurations that can be achieved to support the corresponding system topology. Not all possible configurations are shown herein for ease of illustration and due to the large number of such possible configurations; however, those illustrated will suggest all other configurations to those skilled in the art.

The HHIL 140 is not shown in the figures for the sake of clarity of illustration. The following configurations are illustrated and described:

1. Default Crosspoint Switch Configuration (FIG. 6)
2. Fibre Channel Arbitrated Loop Topology (FIG. 7)
3. Point-to-Point Topology (FIG. 8)
4. Mixed Topology (FIG. 9)
5. Broadcast (or "One to Many")Topology (FIG. 10)

The configuration shown in FIG. 6 is the default configuration assumed upon power up or system reset. All ports are "wrapped" back on themselves through the switch 138, Each port's input signal is monitored via the CRU/SDU circuit in its corresponding PBC 136 and the status is reported to the HHIL 140 via the FAIL signal. In this configuration, the mini-hub is ready to support any other possible configuration depending on the desired mode of operation. In the auto mode of operation, the mini-hub will switch ports into an arbitrated loop when a valid input signal is detected. In the managed mode of operation, the mini-hub receives and executes configuration commands from the host computer.

The configuration shown in FIG. 7 supports the standard FC arbitrated loop type topology. This configuration is possible in either the auto mode of operation or the managed mode of operation. In the illustrated configuration, ports A through C and E through H are switched into the loop. Port D is not in the loop, for example, because port D's input signal is not valid (auto mode or managed mode) or because the host computer has issued a command to specifically exclude port D from the loop (managed mode only).

The configuration shown in FIG. 8 supports either FC or FX type applications. This configuration is only possible in the managed mode of operation. In the illustrated configuration, ports A and B are configured point-to-point as are ports C and F with all other PORTs being "wrapped." There are no restrictions as to which two ports are configured point-to-point other than once a port is connected into a point-to-point configuration it cannot be reconnected to another port without first being disconnected from the first connection.

The configuration shown in FIG. 9 supports either FC or FX type applications. This configuration is only possible in managed mode of operation. In the illustrated configuration, ports A, B, and C are configured into a first arbitrated loop; ports D and G are configured as point-to-point; and, ports E, F, and H are configured into a second arbitrated loop.

The configuration shown in FIG. 10 supports FX type applications only. Specifically, when a single source is sending data to multiple destinations. This configuration is only possible in the managed mode of operation. In the illustrated configuration, port B's is connected to the inputs of ports D, F, G, and H. All other unused ports are "wrapped."

Having thus described the invention of the present application in detail and by reference to preferred embodiments thereof, it will be apparent that modifications and variations are possible without departing from the scope of the invention defined in the appended claims.

What is claimed is:

1. A hub for interconnecting a plurality of communications channels comprising:

a plurality of ports;

a plurality of port bypass circuits connected to and corresponding in number to said plurality of ports;

a switch connected to said plurality of port bypass circuits; and a logic circuit connected to said switch and said plurality of port bypass circuits for interfacing said hub to a system bus of a host computer hosting said hub.

2. A hub as claimed in claim 1 further comprising a power monitoring circuit connected to said logic circuit.

3. A hub as claimed in claim 1 wherein one of said ports may comprise a gigabit interface converter.

4. A hub as claimed in claim 1 wherein said hub can be managed via control signals sent to said logic circuit via said system bus of said host computer.

5. A hub as claimed in claim 1 wherein said plurality of ports comprises 4 ports.

6. A hub as claimed in claim 1 wherein said plurality of ports comprises 8 ports.

7. A hub as claimed in claim 1 wherein said switch comprises an 8×8 crosspoint switch.

8. A hub for interconnecting a plurality of communications channels, said hub being used in a host computer having a power supply and including support structure for said hub which comprises:

a circuit card adapted for installation in said host computer, said circuit card receiving power from said power supply of said host computer;

a plurality of ports mounted on said circuit card;

a plurality of port bypass circuits mounted on said circuit card, said plurality of port bypass circuits being connected to and corresponding in number to said plurality of ports;

a switch mounted on said circuit card, said switch being connected to said plurality of port bypass circuits; and a logic circuit mounted on said circuit card, said logic circuit connected to said switch and said plurality of port bypass circuits for interfacing said hub to a system bus of said host computer.

9. A hub as claimed in claim 8 wherein said circuit card comprises a CompactPCI form factor.

10. A hub as claimed in claim 8 wherein said circuit card comprises a PMC form factor.

11. A hub as claimed in claim 8 wherein said circuit card comprises a VME form factor.

12. A circuit card hub for use in a host computer for interconnecting a plurality of communications channels, said circuit card hub comprising:

a plurality of ports;

a plurality of port bypass circuits connected to and corresponding in number to said plurality of ports;

a switch connected to said plurality of port bypass circuits; and a logic circuit connected to said switch and said plurality of port bypass circuits for interfacing said hub to a system bus of a host computer hosting said hub, said circuit card hub being installed in said host computer and receiving power from said host computer.

13. A circuit card hub as claimed in claim 12 wherein said hub can be managed via control signals sent to said logic circuit via said system bus of said host computer.

14. A circuit card hub as claimed in claim 12 wherein said plurality of ports comprises 4 ports.

15. A circuit card hub as claimed in claim 12 wherein said plurality of ports comprises 8 ports.

16. A circuit card hub as claimed in claim 12 wherein said circuit card comprises a CompactPCI form factor.

17. A circuit card hub as claimed in claim 12 wherein said circuit card comprises a PMC form factor.

18. A circuit card hub as claimed in claim 12 wherein said circuit card comprises a VME form factor.

* * * * *